Nov. 14, 1967  V. A. AGOSTINI  3,352,049
FISHHOOK RELEASING AND RETRIEVING MEANS
Filed Feb. 26, 1965  2 Sheets-Sheet 1

Victor A. Agostini
INVENTOR.

BY
Attorneys

Nov. 14, 1967   V. A. AGOSTINI   3,352,049
FISHHOOK RELEASING AND RETRIEVING MEANS
Filed Feb. 26, 1965
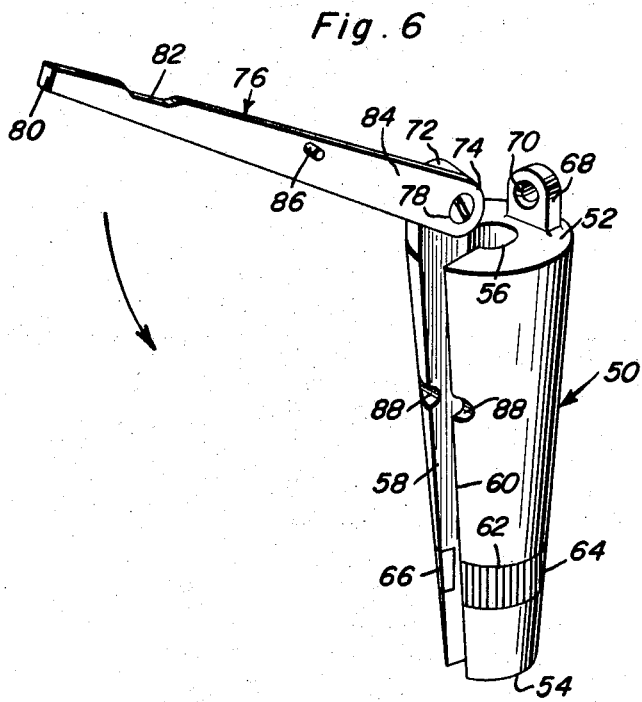
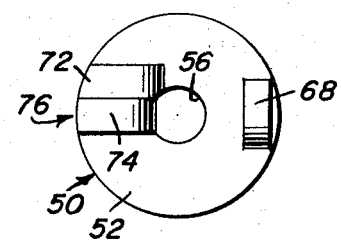
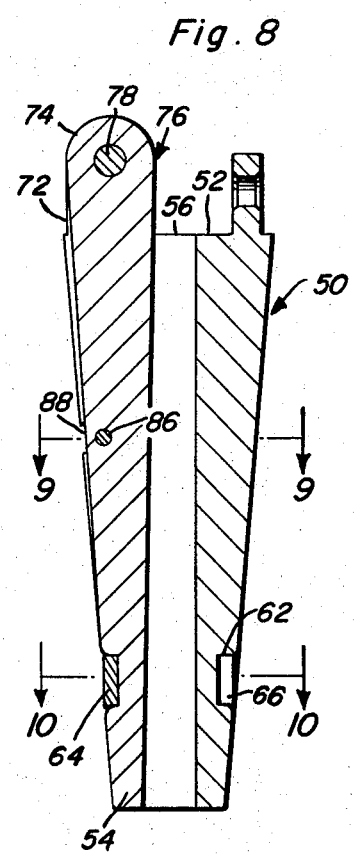
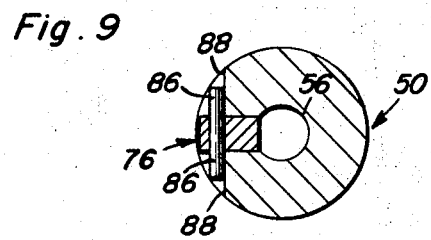
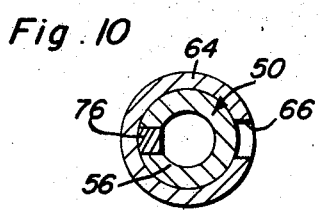
Victor A. Agostini
INVENTOR.

United States Patent Office 3,352,049
Patented Nov. 14, 1967

3,352,049
FISHHOOK RELEASING AND RETRIEVING
MEANS
Victor A. Agostini, 302 Washington Ave.,
Bennington, Vt. 05201
Filed Feb. 26, 1965, Ser. No. 435,415
6 Claims. (Cl. 43—17.2)

ABSTRACT OF THE DISCLOSURE

Both embodiments of the invention embody a weighted body with a bore and a radial slot communicating with the bore and opening through the periphery of the body. A lug on the upper end serves to accommodate a lifting and lowering line. The slot closing means of one embodiment comprises a sleeve rotatably mounted in the bore, the sleeve having a slot capable of being aligned or misaligned with the slot in the weighted body. The sleeve has a fingergrip operable between limit stops one of which is a setscrew. In the other embodiment a split collar is mounted for rotation in a groove in the weighted body and a lever is pivotally mounted on the weighted body and is swingable into the slot thereof and is held by the split collar.

This invention relates to fishhook releasing and retrieving means which is functionally designed and structurally adapted to be readily attached to a fishing line when, as often happens, the fishhook or the hook-equipped lure anchors itself on underwater rocks, logs or similar obstructions.

An object of the present invention herein revealed is to structurally and functionally improve upon prior art adaptations, for example, my prior Patent 3,029,542.

The above patent is significant in that it shows that it is old in the art to provide an elongated weighted body having an axial passage and a radial slot opening through the periphery at one side of and which is appropriately receptive of the fishing line. This body slot is openable and closable by a complemental turnable sleeve which has a companion slot which can be selectively adjusted to achieve the body attaching and detaching results desired.

In carrying out the present invention the head and associated cup shown at the upper end of the patented device and the sleeve are both dispensed with. More particularly, the U-shaped spring clip disclosed in the prior patent, and which has now been found to be objectionable, has also been dispensed with.

Briefly the herein disclosed construction employs an elongated fishhook freeing weight which is preferably truncated conical in form and which when reciprocated on the fishing line by a hand-controlled raising and lowering line has been found to successfully dislodge and release the hook or lure as the case may be. This weight is provided with an axial bore opening at its upper and lower ends through the respective upper and lower ends of the same and is provided along one side with an open-ended slot communicating with the bore and also opening outwardly through a peripheral surface of the one side and permitting a snagged fishing line to enter the bore by way of the slot. The upper end of the weight is flat and has an integral upstanding lug positioned adjacent one side of the weight diametrically opposite the slot. This lug has a hole passing therethrough and provides an ear to which a lower end of the raising and lowering line can be attached. Means is provided and manually rotatable on the weight and has the capability of opening and closing the slot in a manner to temporarily and slidingly mount the weight on the fishing line.

Two embodiments of the invention are provided. In one form or embodiment the weight is provided with a peripheral groove and the aforementioned means comprises a split collar which is confined and rotatably mounted in the groove, the split in the collar being registrable at will with the slot and functioning to serve as a retainer for a slot closing lever which is pivotally mounted on the upper end of the weight.

In another form of the invention the means comprises a sleeve fitting and conformingly mounted for rotation in the bore of the weight. The sleeve is provided with an open-ended slot which can be aligned with the weight whenever necessary or desired. The upper end of the weight is provided with diametrically opposite upstanding limit stops. The sleece is provided at its upper end with a radial fingergrip which is selectively engageable with the limit stops. One limit stop comprises a setscrew which has its head so located that it functions to bind against the upper end of the sleeve or alternatively serves to engage a portion of the fingergrip in a manner to properly interrelate the slots in the weight and sleeve and to hold the sleeve in a given position with its slot open or closed as the case may be.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a view in perspective showing a modified form of the invention with the aforementioned slot-closing lever swung up to the position necessary for attaching the device to a fishing device;

FIGURE 7 is a top plan view of FIGURE 6 with the lever closed;

FIGURE 8 is a longitudinal sectional view based on FIGURE 7; and

Figure 1:
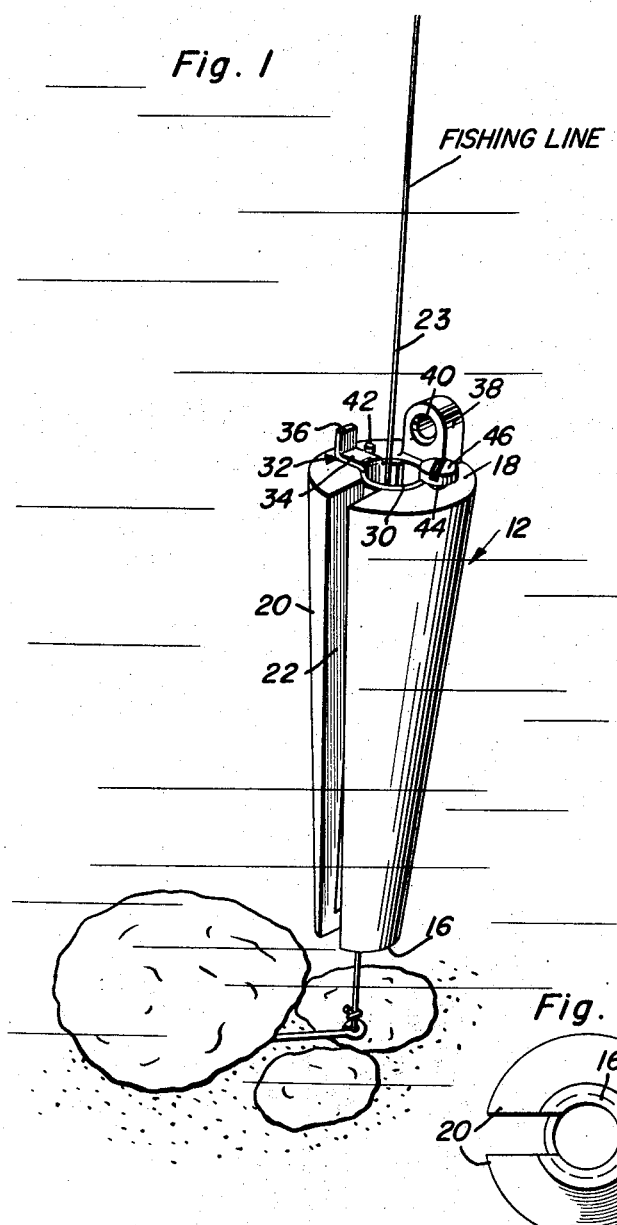
FIGURE 1 is a view in perspective of a fishhook releasing and retrieving device constructed in accordance with the invention showing the same attached to the fishing line and readied for use.

FIGURES 9 and 10 are horizontal sections taken on the section lines 9—9 and 10—10, respectively of FIG. 8.

Referring first to the form of the invention shown in FIGS. 1 to 5, inclusive, it will be noted that the truncated conical gravity descending weight is denoted by the numeral 12, said weight having an axial bore 14 passing therethrough and opening through the smaller lower end 16 and the enlarged upper end 18. The open-ended radial slot in the peripheral surface 20 is denoted at 22 and communicates with the bore to permit the fishing line 23 to enter and assume the position shown in FIG. 1. The complemental open-ended sleeve 24 is fitted for rotation in the bore and has its lower end 26 abutting a ledge 28 provided at the lower end of the bore. The upper end 30 is flush with the flat upper end of the weight and is provided on one side with an L-shaped fingergrip 32 having a horizontal portion 34 movable over the surface 18 and an upstanding grip portion 36.

Figure 2:
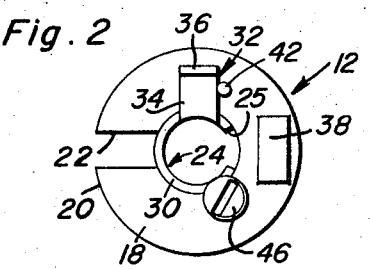
FIGURE 2 is a top plan view of the device removed from the fishing line.
Figure 3:
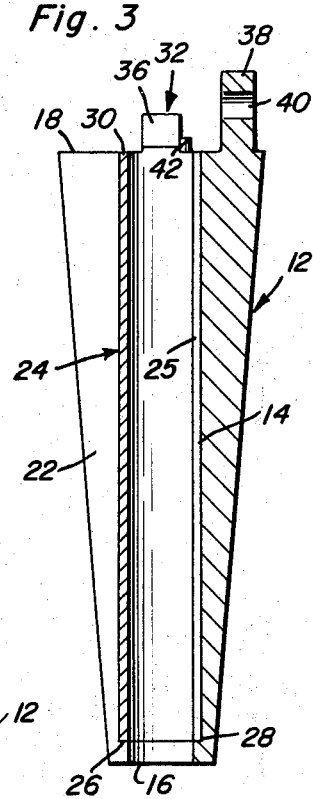
FIGURE 3 is a central longitudinal sectional view through the device with the slots closed as shown in FIG. 2.
Figure 4:
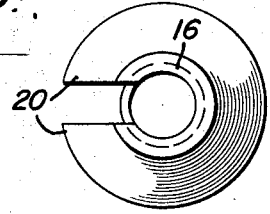
FIGURE 4 is a bottom plan view.
Figure 5:
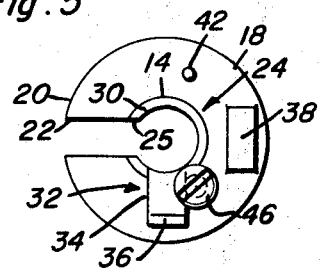
FIGURE 5 is a top plan view similar to FIG. 2 but with the two slots registering and readied to permit the device to be attached to the fishing line.

It will be noted that the upper end is provided with a lug 38 having a hole 40 passing therethrough whereby to provide attaching means for a lifting and lowering line (not shown). This lug is diametrically opposite the slot 22. In between the slot and lug and at equidistant circumferentially spaced points limit stops are provided. One limit stop comprises an integral upstanding stud 42 which is at the left in FIG. 1. The finger piece is engageable therewith when the slot 25 in the sleeve is closed. To assist in maintaining the slots closed the other limit stop comprises a setscrew 44 whose slotted head 46 is selectively engageable with the upper edge or end 30 of the sleeve or with the horizontal part 34 of the fingerpiece as shown in FIGS. 2 and 5, respectively. For example, in FIG. 2 the head or setscrew is screwed down tightly against the edge 30 to keep the slot 25 in the closed position shown. When it is desired to use the device the fingerpiece 32 is swung around to the position shown in FIG. 5 and the head of the setscrew is screwed down on the part 34 to be sure that the two slots 25 and 22 are in proper alignment. This facilitates placing the device in readiness for use on the fishing line. When it is applied the slots are misaligned as shown in FIGS. 1, 2 and 3 in particular whereupon the setscrew is screwed down to maintain the slots in this relationship.

With reference now to the second form of the invention shown in FIGS. 6 to 10, inclusive, it will be seen that the truncated conical slotted body weight is denoted by the numeral 50, the upper end being designated at 52, the lower end at 54 and the bore at 56, said bore provided at one side with a slot 58 which opens through the peripheral surface 60. It will be noted that this surface is provided near the bottom with a circumferential groove 62 into which a split collar 64 is rotatively fitted. The split or open portion 66 of the collar can be registered with the slot 58 in the manner shown in FIG. 6. Then the collar can be turned by hand so that the portion bridging the slot closes the slot as shown in FIG. 8. The upper end 52 is provided diametrically opposite the slot 68 with an upstanding lug 68 having a hole 70 therethrough. A second lug 72 is also provided at the upper end and this lug is in alignment with the slot 58 and serves to accommodate the cooperating end portion 74 of a slot blocking and closing lever 76. The rounded end portion 74 is superimposed on the lug and is hingedly bolted or otherwise fastened thereto as at 78. The free or lower end portion of the lever is denoted at 80 and a collar seating recess is provided at 82. The position of the recess relative to the collar is shown in FIG. 8 in which position the lever has been swung down into the slot to block and close the same. The upper median portion 84 of the lever is provided with outstanding abutment pins 86 which are seatable in notches 88 provided therefor in the peripheral surface 60. The purpose of these abutments or pins 86 is to limit the downward and inward swinging position of the lever when the lever is in closed position and to prevent the lever from swinging too far and into the bore 56 and interfering with the fishing line (not shown).

It will be understood that in this form of the invention the lever 76 has to be swung up to the open position shown in FIG. 6 in order to permit the fishing line (not shown) to be introduced. After the fishing line has been put in position or, contrawise, the device applied to the line, it will be seen that the lever will be swung down to block the slot and the collar 64 will be adjusted to hold the lever in its downward slot closing position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Fishhook releasing and retrieving means comprising: an elongated truncated conical fishhook freeing weight having an axial bore opening at its upper and lower ends through the respective upper and lower ends of said weight and provided along one side with an open-ended slot communicating with said bore and also opening outwardly through a peripheral surface of said one side and permitting a snagged fishing line to enter said bore by way of said slot, the upper end of said weight being flat and having an integral upstanding lug positioned adjacent that side of the weight diametrically opposite said slot, said lug having a hole passing therethrough and providing an ear to which a lower end of a weight lifting and lowering line can be connected, said upper end also being provided with a limit stop stud located between said slot and lug and further provided with a setscrew, the latter being situated diametrically opposite said stud and between said slot and lug, a sleeve rotatively mounted in said bore and having a slot therein adapted to be aligned and misaligned with said slot in said weight, said sleeve being provided at its upper end with a radial fingergrip which is manually movable and adjustable from a position abutting said stud to a position abutting said setscrew, and the head of said setscrew being capable of being screwed down to engage the upper end of said sleeve to lock the sleeve closed, or and when desired screwed in a position engaging said fingergrip and securing the sleeve in an open position.

2. Fishhook releasing and retrieving means comprising: a weight having an axial bore opening at its upper and lower ends through the respective upper and lower ends of said weight and provided along one side with an open-ended slot communicating with said bore and also opening outwardly through a peripheral surface of said one side and permitting a snagged fishing line to enter said bore by way of said slot, the upper end of said weight being flat and having an integral upstanding lug positioned adjacent that side of the weight diametrically opposite said slot, said lug having a hole passing therethrough and providing an ear to which a lower end of a weight lifting and lowering line can be connected, a second upstanding lug fixed atop said upper end and aligned with the adjacent upper end of said slot, a slot blocking and closing lever having an upper end pivotally joined to said second lug, said lever fitting into said slot when in its usable state, and means carried by said weight and embracing a coacting portion of the lever to retain it in its closed position in said slot.

3. The structure according to claim 2, and wherein said means comprises a split collar mounted for rotation in a circumferential groove provided therefor in the peripheral surface of said weight, the split in said collar being registrable with said slot and lever at will and also being adapted to embrace a portion of the lever in a manner to retain it in a closed position in said slot.

4. The structure according to claim 3, and wherein said lever is provided with weight abutting and limit stop pins adapted to nest themselves in keeper seats provided therefor in an oriented surface portion of said weight.

5. Fishhook releasing and retrieving means comprising: an elongated truncated conical fishhook freeing weight having an axial bore opening at its upper and lower ends through the respective upper and lower ends of said weight and provided along one side with an open-ended slot communicating with said bore and also opening outwardly through a peripheral surface of said one side and permitting a snagged fishing line to enter said bore by way of said slot, the upper end of said weight being flat and having an integral upstanding lug positioned adjacent that side of the weight diametrically opposite said slot, said lug having a hole passing therethrough and providing an ear to which a lower end of a weight lifting and lowering line can be connected, said upper end being also provided with opposite upstanding limit stops, a sleeve conformingly and fittingly mounted for rotation in the bore of said weight, said sleeve being provided with an open-ended slot which can be aligned or misaligned with the slot in said weight whenever necessary or desired, said sleeve being provided at its upper end with a radial fingergrip which is located for movement between and is selectively engageable with said limit stops, one limit stop comprising a fixed stud and the other limit stop comprising a setscrew, the head of which can be screwed down and engaged (1) with the upper end of the sleeve or (2) adjusted up or down and releasably engaged with said fingergrip.

6. Fishhook releasing and retrieving means comprising an elongated weight having an axial bore and provided along one side with a slot communicating with said bore, the upper end of said weight having an upstanding lug positioned adjacent a side of the weight diametrically opposite said slot, said lug constituting an ear to which the lower end of a weight lifting line can be connected, said upper end being provided with circumferentially spaced upstanding limit stops, a sleeve mounted for rotation in said bore, said sleeve being provided with an open-ended slot which can be aligned or misaligned with the slot in said weight, said sleeve being provided at its upper end with a radial fingergrip which is shiftably engageable with said upper end of said weight and is located for movement between and is selectively engageable with said limit stops, one of said limit stops comprising a fixed stud, the other of said limit stops comprising a setscrew, said fingergrip being capable of temporary retention in a set position by screwing the head of the setscrew down and into engagement with said fingergrip.

References Cited

UNITED STATES PATENTS

| | | | |
|---|---|---|---|
| 327,100 | 9/1885 | Palm | 43—44.91 |
| 1,042,630 | 10/1912 | Wetmore | 43—17.2 |
| 2,534,790 | 12/1950 | Moore | 43—17.2 |
| 3,010,243 | 11/1961 | Dickinson | 43—44.9 X |
| 3,016,649 | 1/1962 | Ratcliff | 43—17.2 |

ALDRICH F. MEDBERY, *Primary Examiner.*

WARNER H. CAMP, *Examiner.*